United States Patent Office 3,517,104
Patented June 23, 1970

3,517,104
FUNGICIDAL COMPOSITIONS AND METHODS EMPLOYING DIALKYLTIN, 1,4-ENDOALKYL-ENE - 2,3 - DIHYDROPHTHAGES AND -1,2,3,6-TETRAHYDROPHTHALATES
Pasquale P. Minieri, 69–12 32nd Ave., Woodside, N.Y. 11377
No Drawing. Continuation-in-part of application Ser. No. 620,251, Mar. 3, 1967. This application May 28, 1969, Ser. No. 828,755
Int. Cl. A01n 9/00
U.S. Cl. 424—288
10 Claims

ABSTRACT OF THE DISCLOSURE

Living plants are protected against attack by fungi by applying to them a fungicidal amount of an organotin compound having the structural formula

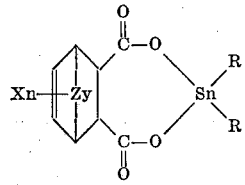

wherein each R represents phenyl or an alkyl group having from 4 to 8 carbon atoms; X represents an alkyl group having from 1 to 4 carbon atoms, an alkenyl group having from 4 to 8 carbon atoms, halogen, or phenyl; Z represents methylene, ethylene, chloromethylene, or chloroethylene; y represents an integer in the range of 0 to 1; and n represents an integer in the range of 0 to 4.

---

This is a continuation-in-part of my copending application Ser. No. 620,251, which was filed on Mar. 3, 1967.

This invention relates to fungicidal compositions and to a method of controlling the growth of fungi. More particularly, it relates to fungicidal compositions that are suitable for use on living plant materials intended for human or animal consumption and to a method of controlling the growth of fungi on plant materials through the use of these compositions.

In accordance with this invention, it has been found that certain organotin hydrophthalates are highly effective against a wide variety of plant pathogens, including those responsible for early blight and late blight of tomatoes, powdery mildew of beams, and other serious crop diseases.

The organotin hydrophthalates that can be used as the primary fungicidally-active component of the compositions of this invention may be represented by the structural formula

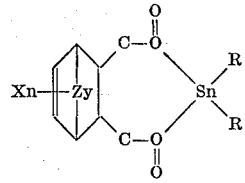

wherein each R represents phenyl or an alkyl group having from 4 to 8 carbon atoms; X represents an alkyl group having from 1 to 4 carbon atoms, an alkenyl group having from 4 to 8 carbon atoms, halogen, or phenyl; Z represents a divalent radical selected from the group consisting of methylene, ethylene, chloromethylene, and chloroethylene; y represents an integer in the range of zero to 1; and n represents an integer in the range of zero to 4. Illustrative of these compounds are the following:

di-n-butyl tin 1,2,3,6-tetrahydrophthalate,
dioctyl tin 1,2,3,6-tetrahydrophthalate,
di-n-butyl tin 3,4-dimethyl-1,2,3,6-tetrahydrophthalate,
di-n-butyl tin 3,4,5-trimethyl-1,2,3,6-tetrahydrophthalate,
di-n-butyl tin 3,4,6-trimethyl-1,2,3,6-tetrahydrophthalate,
dioctyl tin 3,4-dimethyl-6-isobutenyl-1,2,3,6-tetrahydrophthalate,
diphenyl tin 3,4-dimethyl-6-butyl-1,2,3,6-tetrahydrophthalate,
di-n-butyl tin 1,4-endomethylene-2,3-dihydrophthalate,
diphenyl tin 1,4-endomethylene-2,3-dihydrophthalate,
di-n-butyl tin 1,4,5,6,7,7-hexachloro-1,4-endomethylene-2,3-dihydrophthalate,
dihexyl tin 1,4,5,6,7,7-hexachloro-1,4-endomethylene-2,3-dihydrophthalate,
di-n-butyl tin 3-methyl-6-isopropyl-3,6-endoethylene-2,3-dihydrophthalate, and the like.

A single organotin hydrophthalate or a mixture of two or more of these compounds may be present in the fungicidal compositions of this invention.

The novel fungicidal compounds may be prepared by any suitable and convenient procedure. For example, they may be prepared by the reaction of the appropriate hydrophthalic anhydride with a dialkyl or diaryl tin oxide or hydrophthalic acid salt with a dialkyl or diaryl tin dichloride. Suitable hydrophthalic anhydrides may be obtained, for example, by the condensation of maleic anhydride with a diene, such as 1,3-hexadiene, 2,4-hexadiene, 3 - methyl - 2,4-hexadiene, 2,4-dimethyl-1,3-pentadiene, dimethylbutadienes, isoprene, 1,1,3 - trimethylbutadiene, 1,1,4-trimethylbutadiene, 1-phenyl-4-methylbutadiene, alloocimene, 5-methyl-4-isopropyl-1,3 - hexadiene, and the like. The compounds in which y in the aforementioned structural formula represents one, that is, those having an endoalkylene group, may be prepared by the reaction of a cyclic diene, such as cyclopentadiene or hexachlorocyclopentadiene, with a dialkyl or diaryl tin maleate.

While the fungicidal compounds of this invention may be applied as such to the soil, they are ordinarily and preferably combined with an inert fungicidal adjuvant carrier and applied as a solution, emulsion, suspension, or dust. Aqueous solutions or suspensions that contain about 0.001 percent to 1 percent by weight, and preferably 0.01 percent to 0.5 percent by weight, of the active agent are particularly suitable for this use. These compositions may also contain about 0.01 percent to 0.1 percent by weight of a wetting agent, such as an alkyl sulfate, an alkyl aryl sulfonate, a sulfosuccinate, a polyethylene glycol ether, and the like. Alternatively, the fungicidal compounds may be dissolved in an organic solvent, such as acetone, naphtha, ethylene chloride, or kerosene, and applied as solutions, or they may be mixed with or deposited upon such finely-divided solid carriers as clay, chalk, bentonite, talc, kaolin, fuller's earth, and the like and applied as dusts.

The fungicidal compounds may be applied by known techniques to plants, to plant seeds, or to the soil in which plants are growing or are to be grown. They may be applied to the parts of the plants above or in the soil, or the plant seeds may be contacted with the fungicidal compound. Alternatively, the fungicide may be introduced into the soil near the roots of the plants or applied to the surface of the soil and then mixed into the soil to the desired depth.

The amount of the fungicidal composition that is applied is dependent upon such factors as the species of plant being treated and the plant pathogen whose control is desired and is that amount which will inhibit or prevent the growth of the plant pathogen while causing little or no injury to the plants. About 1 pound to 200 pounds of the active compound is ordinarily applied per acre, with particularly good results being obtained when 5 pounds to 35 pounds per acre is used.

The organotin hydrophthalates may be used as the sole active component of the fungicidal compositions. If desired, however, these compositions may also contain other fungicides, such as sulfur and the metal dimethyldithiocarbamates; insecticides, such as DDT and benzene hexachloride; or plant nutrients, such as urea, ammonium nitrate, and potash.

The invention is further illustrated by the examples that follow.

EXAMPLE 1

To 476 grams (3.5 moles) of freshly-distilled allo-ocimene was added a solution of 245 grams (2.5 moles) of maleic anhydride in 720 grams (8.17 moles) of ethyl acetate at such a rate that the temperature rose to 88°–90° C. and remained at that temperature throughout the addition. The reaction mixture was heated with stirring at 88°–90° C. for 5 hours and then heated under vacuum to remove the ethyl acetate. The residue was distilled under reduced pressure to remove unreacted allo-ocimene from the product. There was obtained about 450 grams of 3,4-dimethyl-6-isobutenyltetrahydrophthalic anhydride.

A mixture of 24.9 grams (0.1 mole) of di-n-butyl tin oxide and 150 ml. of toluene was heated to its reflux temperature to remove traces of water by azeotropic distillation and then cooled. 3,4-dimethyl-6-isobutenyltetrahydrophthalic anhydride (23.4 grams, 0.1 mole) was added, and the reaction mixture was heated at its reflux temperature for 3 hours and then allowed to stand at room temperature overnight. Upon removal of the toluene by distillation under vacuum, there was obtained 48.3 grams of di-n-butyl tin 3,4-dimethyl-6-isobutenyl-1,2,3,6-tetrahydrophthalate, which contained 24.3 percent Sn (calculated for $C_{20}H_{36}O_4Sn$, 24.6 percent Sn).

EXAMPLE 2

A mixture of 24.9 grams (0.1 mole) of di-n-butyl tin oxide in 160 ml. of toluene was heated to its reflux temperature to remove traces of water by azeotropic distillation and then cooled. Tetrahydrophthalic anhydride (15.2 grams, 0.1 mole) was added, and the reaction mixture was heated at its reflux temperature for 3 hours and then allowed to stand at room temperature overnight. Upon removal of the toluene by distillation under vacuum, there was obtained 40.2 grams of di-n-butyl tin 1,2,3,6-tetrahydrophthalate, which melted at 72°–74.5° C. and which contained 30.2 percent Sn (calculated for $C_{16}H_{26}O_4Sn$, 29.0 percent Sn).

EXAMPLE 3

A mixture of 9.9 grams (0.15 mole) of cyclopentadiene, 49.4 grams (0.15 mole) of dibutyl tin maleate, and 200 ml. of benzene was stirred at room temperature for 4.5 hours and then heated at its reflux temperature for 2 hours. After being cooled slowly to room temperature, the reaction mixture was heated under vacuum to remove the benzene. The residue was recrystallized from dilute acetic acid. There was obtained 45.2 grams of di-n-butyl tin 1,4-endomethylene-2,3-dihydrophthalate, which melted at 222°–227° C. and which contained 29.6 percent Sn (calculated for $C_{17}H_{26}O_4Sn$, 28.7 percent Sn).

EXAMPLE 4

A mixture of 109.2 grams (0.4 mole) of hexachlorocyclopentadiene, 32.9 grams (0.1 mole) of dibutyl tin maleate, and 200 ml. of xylene was heated at its reflux temperature for 18 hours. After being cooled slowly to room temperature, the reaction mixture was heated under vacuum to remove the xylene. The residue was recrystallized from methanol and dried under vacuum at 60° C. There was obtained 47.2 grams of di-n-butyl tin 1,4,5,6,7,7-hexachloro-1,4-endomethylene - 2,3 - dihydrophthalate, which melted at 160°–170° C. and which contained 33.7 percent Cl and 19.1 percent Sn (calculated for $$C_{17}H_{20}Cl_6O_4Sn$$

34.6 percent Cl and 19.4 percent Sn).

EXAMPLE 5

Acetone solutions were prepared by dissolving 100 mg. portions of the products of Examples 1–4 in 10 ml. of acetone that contained 2000 p.p.m. of sorbitan trioleate (Span 85) and 5000 p.p.m. of a polyoxyethylene ether of sorbitan monooleate (Tween 80). The acetone solutions were dispersed in 90 ml. portions of distilled water to form aqueous solutions that contained 1000 p.p.m. of the fungicidal compound. More dilute solutions were prepared by adding distilled water to these solutions.

EXAMPLE 6

A series of experiments was carried out in which tomato plants which had been sprayed with the aqueous solutions of Example 5 were sprayed with a suspension of *Alternaria solani*, the fungus that causes early blight of tomatoes. One week after treatment, the degree of suppression of the disease was noted. The results are given in Table I.

TABLE I

| Fungicide | Concentration of fungicide in aqueous solution (p.p.m.) | Percent control of early blight of tomato |
|---|---|---|
| Product of Ex. 1 | 1,000 | 100 |
|  | 500 | 94 |
|  | 100 | 92 |
|  | 20 | 63 |
| Product of Ex. 2 | 1,000 | 45 |
| Product of Ex. 3 | 1,000 | 99 |
|  | 500 | 79 |
|  | 250 | 52 |
| Product of Ex. 4 | 1,000 | 99 |
|  | 500 | 97 |
|  | 100 | 86 |
|  | 20 | 69 |

EXAMPLE 7

Tender green bean plants with fully expanded primary leaves were inoculated with spores of *Erypsiphe polygoni*, the powdery mildew fungus. Forty-eight hours later, the plants were sprayed with aqueous solutions prepared by the process of Example 5. After a period of 7–10 days, the degree of suppression of the disease was noted. The results obtained are summarized in Table II.

TABLE II

| Fungicide | Concentration of fungicide in aqueous solution (p.p.m.) | Control powdery mildew of beans |
|---|---|---|
| Product of Ex. 1 | 1,000 | Good control. |
| Product of Ex. 2 | 1,000 | Do. |
| Product of Ex. 4 | 1,000 | Complete control. |
|  | 500 | Fair control. |

What is claimed is:

1. The method of protecting living plants from attack by fungi which comprises applying to the plants a fungicidal amount of an organotin compound having the structural formula

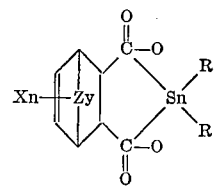

wherein each R represents a member selected from the group consisting of phenyl and alkyl groups having from 4 to 8 carbon atoms; X represents a member selected from the group consisting of alkyl groups having from 1 to 4 carbon atoms, alkenyl groups having from 4 to 8 carbon atoms, halogen, and phenyl; Z represents a member selected from the group consisting of methylene, ethylene, chloromethylene, and chloroethylene; y represents an integer in the range of zero to 1; and n represents an integer in the range of zero to 4.

2. The method of claim 1 wherein the organotin compound is di-n-butyl tin 1,2,3,6-tetrahydrophthalate.

3. The method of claim 1 wherein the organotin compound is di-n-butyl tin 3,4-dimethyl-6-isobutenyl-1,2,3,6-tetrahydrophthalate.

4. The method of claim 1 wherein the organotin compound is di-n-butyl tin 1,4-endomethylene-2,3-dihydrophthalate.

5. The method of claim 1 wherein the organotin compound is di-n-butyl tin 1,4,5,6,7,7-hexachloro-1,4-endomethylene-2,3-dihydrophthalate.

6. A composition for controlling the growth of fungi on living plants that comprises (a) a fungicidally effective amount of an organotin compound having the structural formula

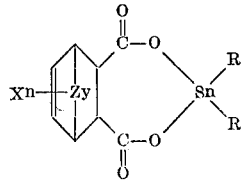

wherein each R represents a member selected from the group consisting of phenyl and alkyl groups having from 4 to 8 carbon atoms; X represents a member selected from the group consisting of alkyl groups having from 1 to 4 carbon atoms, alkenyl groups having from 4 to 8 carbon atoms, halogen, and phenyl; Z represents a member selected from the group consisting of methylene, ethylene, chloromethylene, and chloroethylene; y represents an integer in the range of zero to 1; and n represents an integer in the range of zero to 4 and (b) an inert fungicidal adjuvant carrier therefor.

7. A composition as set forth in claim 6 wherein the organotin compound is di-n-butyl tin 1,2,3,6-tetrahydrophthalate.

8. A composition as set forth in claim 6 wherein the organotin compound is di-n-butyl tin 3,4-dimethyl-6-isobutenyl-1,2,3,6-tetrahydrophthalate.

9. A composition as set forth in claim 6 wherein the organotin compound is di-n-butyl tin 1,4-endomethylene-2,3-dihydrophthalate.

10. The composition as set forth in claim 6 wherein the organotin compound is di-n-butyl tin 1,4,5,6,7,7-hexachloro-1,4-endomethylene-2,3-dihydrophthalate.

References Cited

UNITED STATES PATENTS

| | | | |
|---|---|---|---|
| 3,037,040 | 5/1962 | Anderson et al. | 260—429.7 |
| 3,068,195 | 12/1962 | Anderson et al. | 260—45.75 |
| 3,095,427 | 6/1963 | Kelso | 260—384 |
| 3,214,453 | 10/1965 | Stern | 260—429.7 |
| 3,232,905 | 2/1966 | Kelso | 260—45.75 |
| 3,306,920 | 2/1967 | Tamblyn et al. | 260—429.7 |
| 3,384,649 | 5/1968 | Kauder | 260—429.7 |

FOREIGN PATENTS 1,413,601 11/1964 France.

ALBERT T. MEYERS, Primary Examiner

S. J. FRIEDMAN, Assistant Examiner

U.S. Cl. X.R.

260—429.7, 346.6, 343.3